United States Patent [19]

Clark et al.

[11] Patent Number: 4,662,795
[45] Date of Patent: May 5, 1987

[54] METHOD OF SUPPORTING A MINE ROOF USING NUT ELEMENT WITH BREAKABLE PORTION

[76] Inventors: Carl A. Clark, 111 Yager Dr., Liverpool, N.Y. 13088; John Rogala, 1615 W. Genesee St., Syracuse, N.Y. 13204

[21] Appl. No.: 612,848

[22] Filed: May 22, 1984

Related U.S. Application Data

[63] Continuation of Ser. No. 310,564, Oct. 13, 1981, abandoned.

[51] Int. Cl.⁴ .............................................. E21D 20/02
[52] U.S. Cl. ................................... 405/261; 10/86 C; 405/260; 411/8; 411/429
[58] Field of Search ....................... 411/8, 9, 2, 82, 429, 411/431; 405/259–261; 10/86 A, 86 C, 86 R

[56] References Cited

U.S. PATENT DOCUMENTS

| | | | |
|---|---|---|---|
| 19,645 | 2/1890 | Keep | 411/429 X |
| 680,991 | 8/1901 | Crosby | 10/86 A |
| 692,812 | 2/1902 | Anderson | 411/429 |
| 1,456,215 | 5/1923 | Brightman | 10/86 C |
| 3,737,027 | 6/1973 | Ball | 405/260 X |
| 3,979,918 | 9/1976 | Vidler | 411/8 X |
| 4,183,699 | 1/1980 | Donan, Jr. et al. | 405/259 |
| 4,295,761 | 10/1981 | Hansen | 411/8 X |
| 4,347,020 | 8/1982 | White et al. | 405/259 X |

FOREIGN PATENT DOCUMENTS

| | | | |
|---|---|---|---|
| 1227097 | 3/1971 | Fed. Rep. of Germany | 10/86 A |
| 1092771 | 11/1954 | France | 411/429 |
| 0088936 | 6/1982 | Japan | 10/86 C |
| 0128237 | 7/1983 | Japan | 10/86 A |
| 8439 | of 1907 | United Kingdom | 10/86 C |
| 2045836 | 11/1980 | United Kingdom | 405/261 |

Primary Examiner—Robert L. Wolfe
Assistant Examiner—Lloyd A. Gall

[57] ABSTRACT

A nut element having a frangible portion for use with an elongated bar having an upper end anchored by a resin material within a drill hole in a mine roof, or the like, and a lower end extending outside the hole and threaded to receive the nut element of the invention. The nut includes a portion spaced from the threaded opening which limits relative rotation of the nut and bar. Thus, rotation of the nut with the lower end of the bar contacting the rotation-limiting portion thereof serves to rotate the bar within the drill hole, causing the upper end of the bar to rupture a conventional two-compartment resin cartridge and mix the contents thereof. When the resin has hardened to hold the bar stationary, excess torque applied to the nut serves to break the rotation-limiting portion thereof, preferably a dome-shaped cap with an opening of smaller diameter than the threaded end of the bar, allowing the nut to be snugly secured against a roof support plate and tension the resin-anchored bar.

4 Claims, 5 Drawing Figures

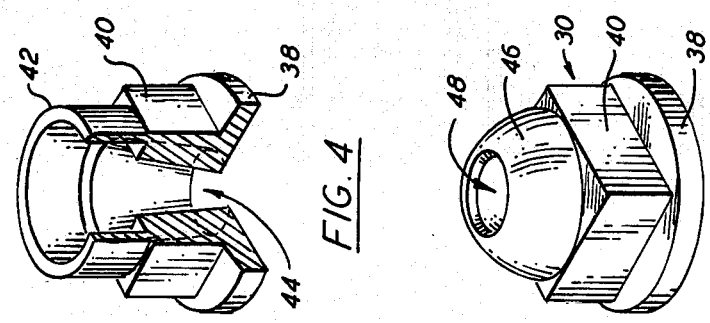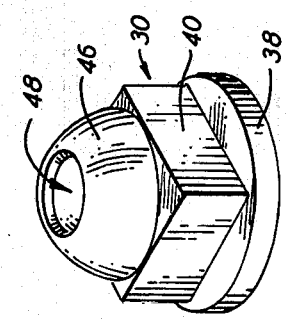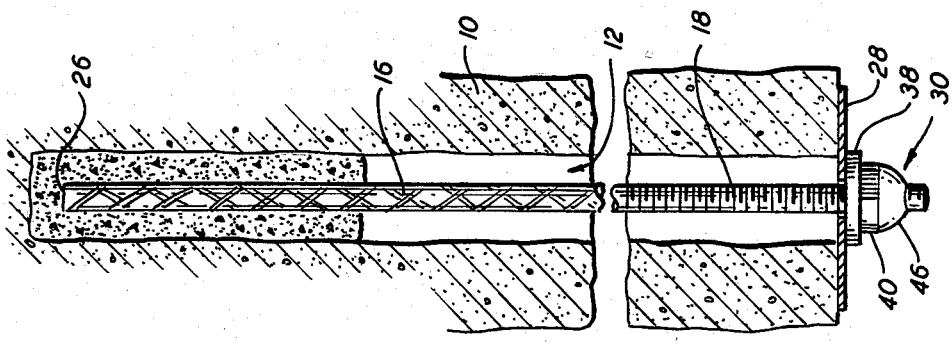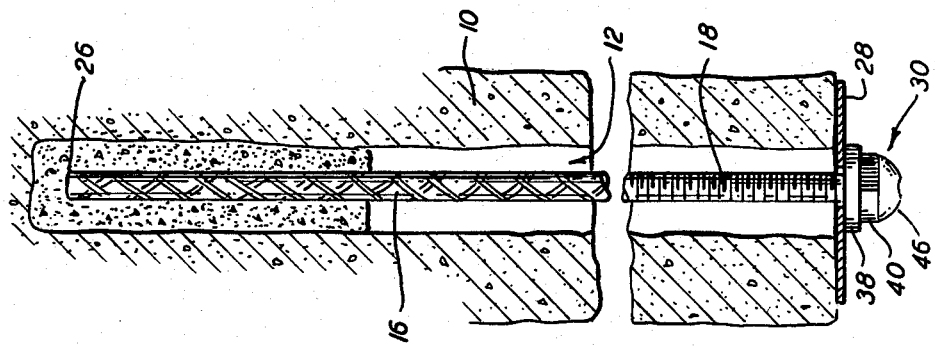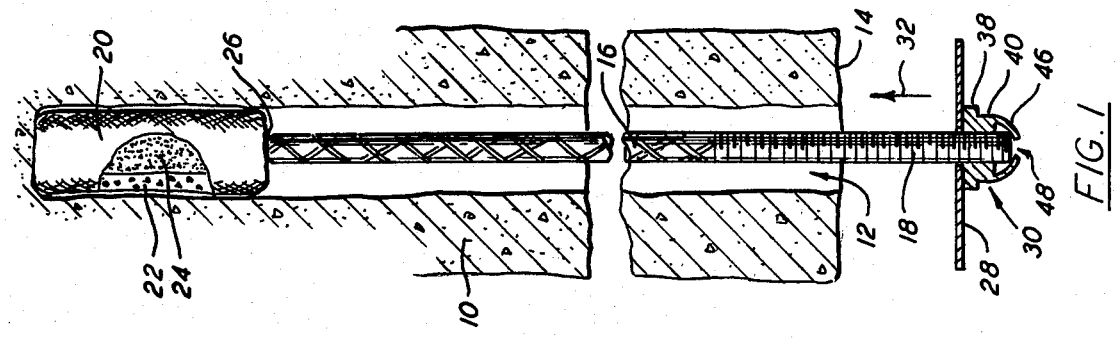

METHOD OF SUPPORTING A MINE ROOF USING NUT ELEMENT WITH BREAKABLE PORTION

This is a continuation of application Ser. No. 310,564, filed 10/13/81 now abandoned.

BACKGROUND OF THE INVENTION

The present invention relates to rock reinforcing structure, and more specifically, to novel elements and methods of manufacture thereof for use in resin anchored, tensioned roof support systems.

In mine work, such as coal mining, or in underground formations such as tunnels or excavations, it is often necessary to reinforce or support the roof and/or walls of the excavation to prevent rock falls or cave-ins. The most common means presently in use for effecting such support include elongated bars or bolts which are inserted in blind drill holes and anchored therein to hold a metal support or bearing plate in tight engagement with the roof or wall surface. Anchoring means within the drill hole normally comprise a mechanical expansion anchor, a hardenable resin or other grouting, or both.

The use of polyester resins in underground formations was disclosed at least as early as the June 4, 1963 U.S. Pat. No. 3,091,935 of Brown and Pritchard entitled "Rock Treatment." It has been found expedient to provide the resin grouting materials in two components each of which remains in a semi-liquid or thixotropic phase until mixed with the other, whereupon curing and hardening progresses to the stage that the steel bolt or bar will fail before the resin bond. The two components, a polyester resin and a catalyst, curing or hardening agent, are commonly provided in a single cartridge wherein they are initially separated in individual compartments such as disclosed, for example, in U.S. Pat. No. 3,324,663 of McLean. Upon insertion of the resin cartridge and elongated bar into the drill hole, the end of the bar contacting the cartridge is used to rupture the two-compartment cartridge and mix the components so that the curing and hardening necessary to retain the bar in the hole may take place.

In addition to anchoring one end of the bar in the drill hole it is also desirable that the bar be placed in tension in order to reinforce the rock formation surrounding the excavation. To this end, a number of systems have been proposed wherein the bolt or bar is threadedly engaged with another member, with some means being provided to limit threaded advance as the resin cartridge is broken and the components mixed, and excess torque applied after the resin has hardened serving to break or deform some portion of the structure to allow further threaded movement and tensioning of the bar. The earliest known example of such anchor systems is Hill U.S. Pat. No. 3,877,235 wherein a relatively thin plate or diaphragm covering one end of a threaded nut is broken by applying excess torque after hardening of the resin grouting. In Koval U.S. Pat. No. 4,051,683 a shear pin extending across an internally threaded coupling member is broken by application of excess torque. In Vass, et al U.S. Pat. No. 4,122,681 initial threaded advance is limited by internally deformed threads, and further threaded advance to tension the bar or bolt is effected by application of excess torque after the resin hardens.

Of the considerable number of proposed systems for tensioning resin-anchored bars or bolts by application of excess torque, many involve structural alteration of, or the insertion of frangible elements directly into, threaded elements of the system. This presents the possibility of failure due to seizing, fouling or stripping of the threads. Also, many of the previously proposed systems require costly structural additions and/or fabrication operations which diminish the economic effectiveness of the system.

It is a principal object of the present invention to provide a novel and improved rock reinforcement system of the type wherein a resin-anchored bar is tensioned by application of excess torque after the resin is mixed and hardened, which is reliable in operation and low in cost.

It is a further object to provide a novel nut element having a frangible portion spaced outwardly from the threaded opening for use in an improved rock reinforcement system wherein the novel nut element provides the improvement.

Another object is to provide a novel method of fabricating a nut element for use in a resin-anchored, tensioned bar rock reinforcement system.

Other objects will in part be obvious and will in part appear hereinafter.

SUMMARY OF THE INVENTION

In accordance with the foregoing objects, the invention contemplates a rock reinforcement system wherein a length of steel reinforcing bar is anchored at one end in a blind drill hole by a conventional resin grouting mix and is threaded on the other end, which extends outside the hole. A bearing plate is supported on the threaded end of the bar by the nut element which constitutes the improvement of the invention. The nut element includes the usual body portion having an internally threaded opening for engagement with the threaded end of the reinforcing bar, and an additional, dome-shaped portion surrounding the threaded opening. An opening in the top of the dome-shaped portion is coaxial with, and of smaller diameter than the threaded opening in the nut. Thus, as the end of the bar is threaded into the nut, threaded advance is limited by contact of the end of the bar with the inside of the dome-shaped portion.

With the nut engaged with the threaded end of the bar to the maximum extent allowed by the dome-shaped portion, rotational torque applied to the nut is transmitted to the bar, thereby causing the end within the hole to break the two-compartment resin cartridge and mix the contents thereof. When the resin has hardened sufficiently to prevent further rotation of the bar, normally less than a minute after mixing is complete, excess torque applied to the nut will fracture the dome-shaped portion, allowing continued threaded advance of the nut on the bar. The nut may then be tightly secured against the bearing plate, or a washer placed between the nut and plate, and sufficient torque applied to produce the desired amount of tension in the resin-anchored bar.

BRIEF DESCRIPTION OF THE DRAWING

FIG. 1 is an elevational view in section, showing the rock reinforcement system, including the novel nut element of the present invention, being inserted in a drill hole in the rock formation to be supported;

FIGS. 2 and 3 are further sectional elevational views showing the reinforcement system at intermediate and final stages of installation, respectively;

FIG. 4 is a perspective view, partly in section, of the nut element of the invention in the form in which it is cast; and FIG. 5 is a perspective view of the nut element in its finished form.

DETAILED DESCRIPTION

Referring now to the drawing, in FIGS. 1-3 is shown a cross section of a rock structure 10, such as the roof of a coal mine, in which a blind drill hole 12 has been formed with conventional drilling tools for the purpose of installing elements which will serve to support surface 14 and generally reinforce the surrounding rock structure. Elongated steel bar 16 is of a commercially available type used in the reinforcement of concrete structures, and therefore commonly referred to as rebar. The length of rebar used in rock reinforcement is, of course, chosen in accordance with the depth of the drill hole, and the diameter is usually either ¾" or ⅞". Rebar 16 is provided with threads 18 extending from one end for a portion of its length.

Conventional resin cartridge 20 is formed in two compartments physically separating components 22 and 24 of a resin grouting mix. Such cartridges are commercially available from a variety of sources and include a polyester resin as one of the components and a reaction agent such as a catalyst or curing or hardening agent as the other. The two components remain in a semi-liquid or thixotropic phase until mixed, whereupon the resin begins to solidify. Curing and solidification continue until an extremely strong bond is formed by the resin grout.

As seen in FIG. 1, cartridge 20 has been placed in drill hole 12 and is supported therein upon end 26 of rebar 16. Threaded end 18 extends outside the drill hole and passes through an opening in support plate 28 which is carried upon nut element 30, threaded upon the end of rebar 16. Cartridge 20 is forced against the end of hole 12 as rebar 16 is moved upward, as indicated in FIG. 1 by arrow 32. Nut element 30 is engaged by a socket tool (not shown) such as employed in bolting machines commonly used in coal mines and elsewhere, which is power-driven to move rebar 16 upwardly and rotate it at a high speed by rotation imparted to nut element 30, as explained later in more detail.

Continued upward movement of rebar 16 from the position of FIG. 1 will rupture cartridge 20, allowing components 22 and 24 to be mixed by rotation of rebar 16. The mixture will fill the space within hole 12 around end 26 for a desired portion of the length of rebar 16.

Before completing the explanation of the rock reinforcement procedure, the structure of nut element 30 will be described in detail. Element 30 is preferably formed as a casting of malleable iron. As seen in FIG. 4, the casting includes a circular or cylindrical base 38, a square body portion 40 and an upstanding flange portion 42, all of which are integrally formed as a single casting. Opening 44 extends through base and body portions 38 and 40 and is subsequently tapped to provide internal threads in the usual manner. It is preferred that the casting be so formed and dimensioned that opening 44 may be tapped to either ¾" or ⅞" diameter. For convenience in casting, opening 44 is initially tapered, having diameters of, for example, ⅝" and ⅞" at its lower and upper ends, respectively, prior to tapping.

The castings are preferably annealed to achieve the necessary hardness, and then tapped to the desired thread diameter.

After tapping, nut element 30 is subjected to a further shaping operation, namely the forming of ring section or flange 42 into a dome-shaped portion, as shown in FIG. 5 and indicated by reference numeral 46. This may be accomplished with a die defining a hemispherical cavity which is forced downwardly over flange 42 with a controlled stroke to the surface of body portion 40 adjoining the outer periphery of the flange, resulting in dome-shaped portion 46 having opening 48 in the top. The wall which forms flange portion 42 is so dimensioned in the casting that the maximum diameter of opening 48 is approximately 9/16", thus being about 3/16" smaller than a ¾" tapped opening and 5/16" smaller than a ⅞" tapped opening in nut element 30. By way of illustration, a nut element having the desired characteristics and dimensions may be formed of malleable iron, ASTM A47 grade 32510, with a flange having a height of 7/16", an external diameter of 1 3/32" and internal diameters at the top or free end of 15/16" and at the bottom or junction with body portion 40 of ⅞".

Returning now to FIG. 1, it may be seen that nut element 30 has been advanced onto threads 18 of rebar 16 until the terminal end of the rebar has engaged the inside of dome-shaped portion 46. Since opening 48 is of smaller diameter than the end of rebar 16, threaded advance is thus limited and rotation imparted to nut element 30 will be transmitted to rebar 16, permitting mixing of the resin components as indicated in FIG. 2. The bolting machine is held in supporting engagement with nut element 30 for a time sufficient to allow the resin mixture to harden enough to prevent further rotation of rebar 16 which for many common resin packages will be only 10 or 15 seconds.

After the resin grouting has hardened to the point of preventing further rotation of rebar 16, excess torque applied to nut element 30 will cause dome-shaped portion 46 to crack or fracture around opening 48. This, of course, permits further threaded advance of nut element 30 on threads 18, urging plate 28 into tight engagement with surface 14 of rock formation 10 and producing a desired degree of tension in rebar 16. In practice, drill hole diameters of 1" and 1⅛" have been used for ¾" and ⅞" thread diameters, respectively, in nut elements constructed substantially in accordance with the example set forth earlier herein, and 15" to 18" of resin. Torque transmitted through the nut to the rebar is sufficient to break the resin cartridge and mix the contents without danger of cracking or breaking dome-shaped portion 46, which is easily fractured to allow thread take-up by application of necessary excess torque after the resin hardens sufficiently to prevent further rotation of rebar 16. Although not shown in the present drawing, a hardened steel washer is usually employed between nut element 30 and plate 28. If desired, after tapping and forming dome-shaped portion 46, nut element 30 may be pearlitized for further hardening.

It may thus be seen that the nut element of the invention provides an effective means of transmitting rotation to a rebar for mixing the components of a resin grouting and then tensioning the bar by application of excess torque after the resin hardens. The nut element is not significantly more expensive than a conventional nut of similar dimensions, requiring only the additional step of pressing the concave die over the flange or ring to form the dome-shaped portion. Since the breakable or frangible portion of the element is spaced outwardly from the end of the tapped portion of the nut, there is no adverse effect on the threads after cracking or breaking by application of excess torque.

What is claimed is:

1. A method of supporting a mine roof and reinforcing the surrounding rock strata comprising:

(a) drilling a hole of predetermined depth into said mine roof;
   (b) forming an elongated, metal rod having external threads extending from one end thereof for at least a portion of its length;
   (c) extending said threaded rod end through an opening in a bearing support plate;
   (d) engaging said external threads with a unitary nut element having an internally threaded opening extending from one side thereof through a body portion, and further having a dome-shaped portion extending integrally from said body portion in encircling, outwardly spaced relation to said threaded opening to an annular lip, axially spaced from and of smaller diameter than said threaded opening and coaxial therewith, said rod extending completely through said threaded opening of said nut until said one end of said rod contacts said dome-shaped portion about an interior surface of said annular lip;
   (e) inserting a resin cartridge containing two components in separate compartments into said drill hole;
   (f) inserting the end of said rod opposite said one end into said drill hole behind said resin cartridge and advancing said rod into said drill hole, said rod having a length so related to said predetermined depth and the size of said cartridge that the latter is broken by advance into said drill hole, thereby releasing the components of said cartridge;
   (g) engaging said nut element with a wrench and imparting rotation to said nut element and thereby to said rod to mix said components, thereby initiating hardening of the resin mix;
   (h) stopping rotation of said nut element and rod until said resin mix has hardened sufficiently to rotationally fix the position of said rod; and
   (i) applying a torque to said nut element sufficient to cause said one end of said rod to fracture said annular lip, thereby substantially removing resistance to rotation of said nut element and allowing tensioning of said rod to a desired degree by application of a predetermined torque to said nut element.

2. The method according to claim 1 wherein said nut element is formed as an integral, one-piece member from a metal casting.

3. The method according to claim 2 wherein said metal casting is of malleable iron.

4. The method according to claim 2 wherein said dome portion is formed in said cast metal as a cylindrical wall extending from said body portion to a free end and surrounding one end of said threaded opening, and is mechanically deformed inwardly at the top to a dome shape terminating in said annular lip.

* * * * *